United States Patent
Uno et al.

(10) Patent No.: US 11,748,925 B2
(45) Date of Patent: Sep. 5, 2023

(54) SURFACE INSPECTION APPARATUS, NON-TRANSITORY COMPUTER READABLE MEDIUM STORING PROGRAM, AND SURFACE INSPECTION METHOD

(71) Applicant: FUJIFILM Business Innovation Corp., Tokyo (JP)

(72) Inventors: Miho Uno, Kanagawa (JP); Kazuya Fukunaga, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/577,375

(22) Filed: Jan. 18, 2022

(65) Prior Publication Data

US 2023/0084258 A1   Mar. 16, 2023

(30) Foreign Application Priority Data

Sep. 10, 2021   (JP) ................. 2021-148133

(51) Int. Cl.
*G06T 11/20*   (2006.01)
*G06T 7/40*   (2017.01)

(52) U.S. Cl.
CPC .............. *G06T 11/206* (2013.01); *G06T 7/40* (2013.01)

(58) Field of Classification Search
CPC ............................... G06T 11/206; G06T 7/40
See application file for complete search history.

(56) References Cited

U.S. PATENT DOCUMENTS

2012/0316847 A1* 12/2012 Hantschel ............. G06Q 10/00
                                                               703/2
2019/0195624 A1*  6/2019 Kato ...................... G06F 18/22

FOREIGN PATENT DOCUMENTS

| JP | 2012002704 | 1/2012 |
| JP | 2018004421 | 1/2018 |
| JP | 6564660    | 8/2019 |

OTHER PUBLICATIONS

Brownell, Joseph, "Change the Chart Type in Excel—Instructions", Jan. 15, 2020, https://www.teachucomp.com/change-the-chart-type-in-excel-instructions/ (Year: 2020).*

* cited by examiner

*Primary Examiner* — Michelle L Sams
(74) *Attorney, Agent, or Firm* — JCIPRNET

(57) ABSTRACT

A surface inspection apparatus includes an imaging device that images a surface of an object to be inspected; and a processor configured to: calculate a texture of the object through processing of an image imaged by the imaging device; and display a symbol representing the texture of the object at a coordinate position on a multidimensional distribution map.

19 Claims, 13 Drawing Sheets

SURFACE INSPECTION APPARATUS, NON-TRANSITORY COMPUTER READABLE MEDIUM STORING PROGRAM, AND SURFACE INSPECTION METHOD

CROSS-REFERENCE TO RELATED APPLICATIONS

This application is based on and claims priority under 35 USC 119 from Japanese Patent Application No. 2021-148133 filed Sep. 10, 2021.

BACKGROUND

(i) Technical Field

The present invention relates to a surface inspection apparatus, a non-transitory computer readable medium storing a program, and a surface inspection method.

(ii) Related Art

Today, in various products, parts made by molding synthetic resin (hereinafter referred to as "molded products") are used. A texture of the molded product changes depending on color, glossiness, micro roughness formed on a surface, and the like.

SUMMARY

A texture is one of items that determine the impression of an appearance. Thus, in a development phase, a process of inspecting the texture of the molded product is provided, and the shortening of a work is required. In the case of a product configured with a plurality of molded products, an additional inspection of texture uniformity is required among the plurality of molded products.

Although an appearance inspection apparatus evaluates the texture by using only color information of L*a*b*, it is difficult to evaluate the texture caused by micro roughness such as emboss in the evaluation by this method.

Aspects of non-limiting embodiments of the present disclosure relate to a surface inspection apparatus, a non-transitory computer readable medium storing a program, and a surface inspection method that a texture of an object surface is easily checked as compared with a case where the texture of the object surface is displayed only as an evaluation value.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a surface inspection apparatus including an imaging device that images a surface of an object to be inspected; and a processor configured to: calculate a texture of the object through processing of an image imaged by the imaging device; and display a symbol representing the texture of the object at a coordinate position on a multidimensional distribution map.

BRIEF DESCRIPTION OF THE DRAWINGS

Exemplary embodiment(s) of the present invention will be described in detail based on the following figures, wherein:

FIGS. 6A and 6B are diagrams illustrating display examples of a two-axis graph, in which FIG. 6A is a display example in a case where "quantification model 1" is used for calculating a texture difference score and FIG. 6B is a display example in a case where "quantification model 2" is used for calculating the texture difference score;

FIGS. 10A to 10H are diagrams illustrating changes in the display of the two-axis graph with the imaging of a reference sample and a target sample, in which FIG. 10A is a screen example corresponding to step S102, FIG. 10B is a screen example corresponding to step S104, FIG. 10C is a screen example corresponding to step S106, FIG. 10D is a screen example corresponding to step S104 after re-imaging, FIG. 10E is a screen example corresponding to step S108 (see FIG. 7), FIG. 10F is a screen example corresponding to step S112, FIG. 10G is a screen example corresponding to step S114, and FIG. 10H is a screen example corresponding to step S116;

DETAILED DESCRIPTION

Hereinafter, exemplary embodiments of the present invention will be described with reference to the drawings.

First Exemplary Embodiment

Usage Example of Surface Inspection Apparatus

Figure 1:
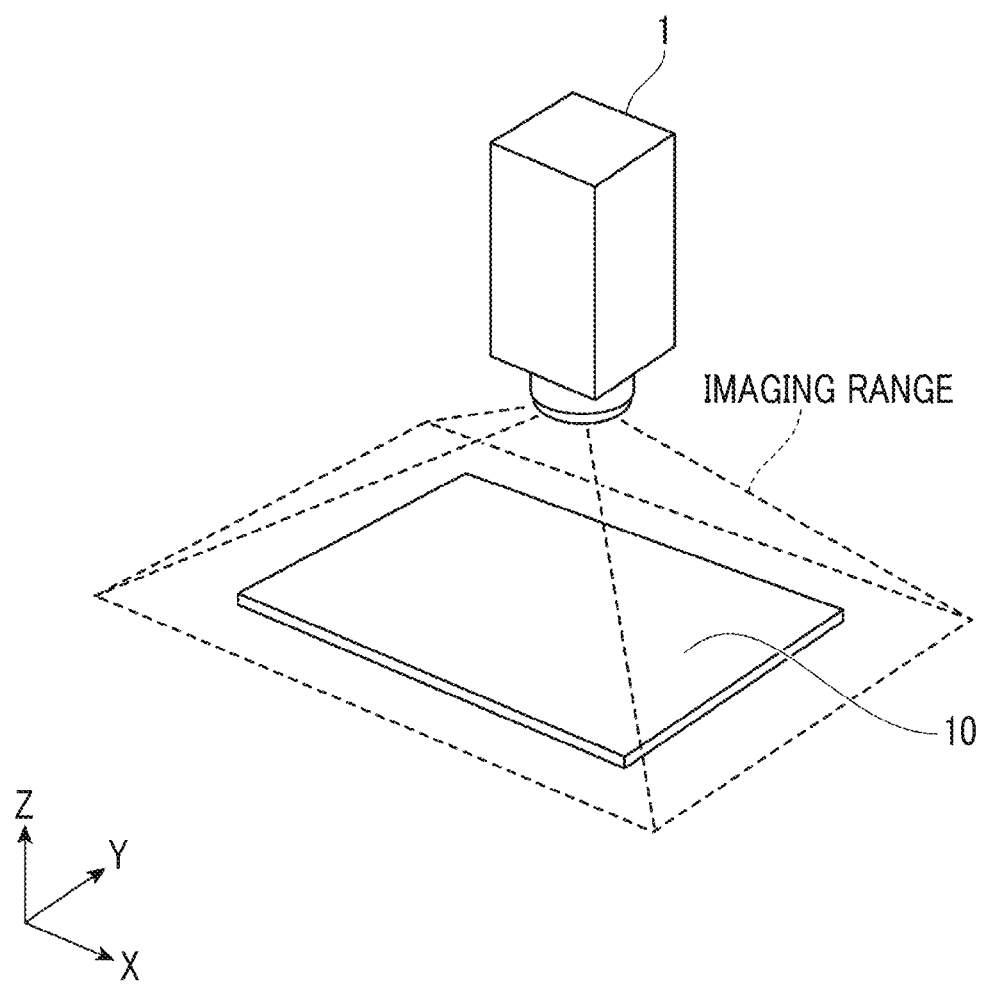
FIG. 1 is a diagram illustrating a usage example of a surface inspection apparatus assumed in a first exemplary embodiment.

FIG. 1 is a diagram illustrating a usage example of a surface inspection apparatus 1 assumed in a first exemplary embodiment.

The surface inspection apparatus used in the first exemplary embodiment is a so-called area camera, and a range to be imaged (hereinafter referred to as an "imaging range") is defined by a surface.

In the case of FIG. 1, the imaging range includes the entire object to be inspected (hereinafter also referred to as an "inspection target") 10. However, the imaging range may include only a portion of the inspection target 10 of interest. In the case of the present exemplary embodiment, a molded product is assumed as the inspection target 10.

In the case of the inspection by the area camera, the inspection by the surface inspection apparatus 1 and the inspection target 10 is performed in a stationary state. In other words, the inspection of the surface of the inspection target 10 is performed in a state where the surface inspection apparatus 1 and the inspection target 10 do not move relatively.

In the case of FIG. 1, the inspection target 10 has a plate shape, but the surface of the inspection target 10 may have any shape. For example, the inspection target 10 may have a shape having a curved surface such as a sphere or a cylinder, in addition to a polyhedron.

The actual inspection target 10 may have holes, notches, protrusions, steps, and the like.

Further, the types of surface finishes of the inspection target 10 include untreated, specular-finished, quasi-specular-finished, and emboss processing. The emboss processing is a process of intentionally forming micro roughness on the surface of the inspection target 10. Textures of the emboss-processed surface change depending on an area ratio of a convex portion and a concave portion, a size of the convex portion, a pattern formed by roughness, a height difference between roughness, a surface material, a color, and the like.

The surface inspection apparatus 1 is used to inspect defects on the surface and textures of the inspection target 10.

The defects include, for example, sink marks and welds. The sink mark refers to a dent on the surface generated in a thick portion or a rib portion, and the weld refers to a streak generated in a portion where tips of a molten resin join in a mold. The defects also include scratches and dents caused by hitting an object.

The texture is a visual or tactile impression, and is influenced by the color, glossiness, and roughness of the surface of the object. The roughness of the surface also include fine streaks generated in cutting the mold. This type of streak is different from the defect.

The surface inspection apparatus 1 according to the present exemplary embodiment can be used not only for inspection of defects and textures, but also for inspection of surface stains.

The surface inspection apparatus 1 according to the present exemplary embodiment has a function of calculating a score representing the texture of each inspection target 10 and a function of calculating a score representing a difference in the texture between the two inspection targets 10 (hereinafter referred to as "texture difference"). The texture difference is calculated at the time of inspection of a plurality of inspection targets 10 for which uniformity of texture is required, for example.

The inspection target 10 shown in FIG. 1 is installed parallel to the planes defined by an X axis and a Y axis. In this case, the normal of the surface of the inspection target 10 is parallel to a Z axis.

The surface inspection apparatus 1 is arranged vertically above the inspection target 10. In the case of the present exemplary embodiment, an optical axis of the camera that images the surface of the inspection target 10 is substantially parallel to the normal of the surface of the inspection target 10. Hereinafter, conditions required for imaging the surface of the inspection target 10 are also referred to as "imaging conditions".

The surface inspection apparatus 1 is installed at a position that satisfies the imaging conditions. The surface inspection apparatus 1 may be fixed to a specific member or may be removable from a specific member.

However, the surface inspection apparatus 1 may be a portable apparatus. In a case where the surface inspection apparatus is the portable apparatus, a person in charge of inspection (hereinafter referred to as an "operator") images the surface of the inspection target 10 by holding the surface inspection apparatus 1 in his or her hand and directing the camera toward the inspection target 10. Although the surface inspection apparatus 1 shown in FIG. 1 is separated from the surface of the inspection target 10, the inspection may be performed in a state where the surface inspection apparatus 1 is in contact with the surface of the inspection target 10.

In FIG. 1, for the purpose of describing the positional relationship between the surface inspection apparatus 1 and the inspection target 10, the appearance of the surface inspection apparatus 1 is simplified and represented as a substantially rectangular parallelepiped. However, the appearance of the surface inspection apparatus 1 is not limited to the substantially rectangular parallelepiped.

Configuration of Surface Inspection Apparatus

Figure 2:
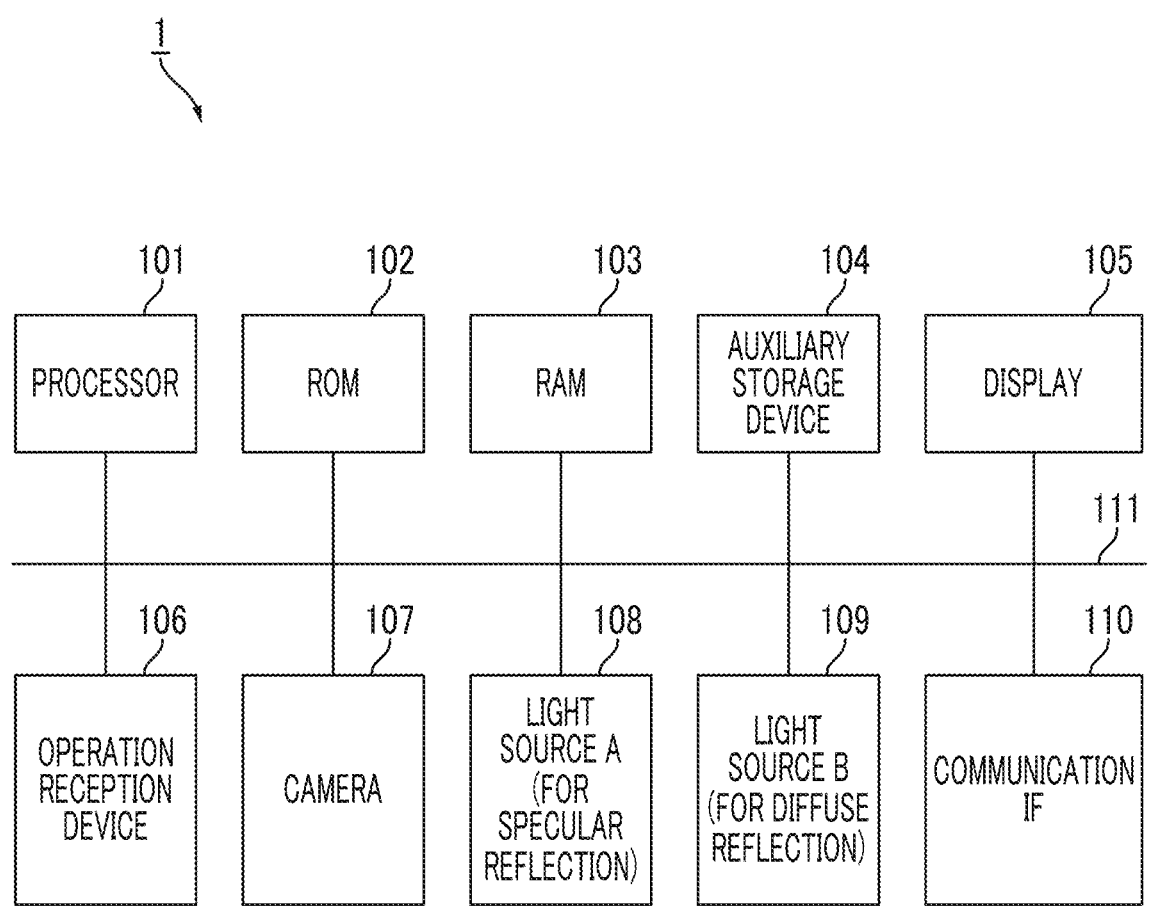
FIG. 2 is a diagram illustrating an example of a hardware configuration of the surface inspection apparatus used in the first exemplary embodiment.

FIG. 2 is a diagram illustrating an example of a hardware configuration of the surface inspection apparatus 1 used in the first exemplary embodiment.

The surface inspection apparatus 1 shown in FIG. 2 includes a processor 101 that controls the operation of the entire apparatus, a read only memory (ROM) 102 in which a basic input output system (BIOS) and the like are stored, a random access memory (RAM) 103 used as a work area of the processor 101, an auxiliary storage device 104 in which programs and image data are stored, a display 105 that displays an imaged image of the surface of the inspection target 10 or information on operations, an operation reception device 106 that receives operations of an operator, a camera 107 that images the surface of the inspection target 10, light sources 108 and 109 that illuminate the surface of the inspection target 10, and a communication interface (IF) 110 used for communication with the outside. The processor 101 and each part are connected to each other through a signal line 111 such as a bus.

The processor 101, the ROM 102, and the RAM 103 function as so-called computers. The processor 101 realizes various functions through the execution of a program. For example, the processor 101 controls the emission of illumination light, displays the image obtained by imaging the surface of the inspection target 10, calculates the score, and the like through the execution of the program.

Image data obtained by imaging the surface of the inspection target 10 is stored in the auxiliary storage device 104. For the auxiliary storage device, for example, a semiconductor memory or a hard disk device is used. Firmware and application programs are also stored in the auxiliary storage device 104. Hereinafter, firmware and application programs are collectively referred to as a "program".

The display 105 is, for example, a liquid crystal display or an organic EL display, and is used for displaying an image obtained by imaging the inspection target 10 and displaying information representing a texture.

In the case of the present exemplary embodiment, the display 105 is integrally provided in the main body of the surface inspection apparatus, but may be a monitor connected through the communication IF 110 or may be a display of a terminal device connected through the communication IF 110. For example, the display 105 may be a display of another computer connected through the communication IF 110. For example, the other computer may be a notebook computer or a smartphone.

The operation reception device 106 is configured with a touch sensor arranged on the display 105, physical switches and buttons arranged on a housing, and the like.

A device that integrates the display 105 and the operation reception device 106 is called a touch panel. The touch panel is used to receive operations of a user on keys displayed in software (hereinafter also referred to as "soft keys").

In the case of the present exemplary embodiment, a color camera is used as the camera 107. For an image sensor of the camera 107, for example, a charge coupled device (CCD) imaging sensor or a complementary metal oxide semiconductor (CMOS) imaging sensor is used.

Since a color camera is used as the camera 107, it is possible to observe not only the brightness of the surface of the inspection target 10 but also the color tone. The camera 107 is an example of an imaging device.

In the case of the present exemplary embodiment, a white light source is used as the light sources 108 and 109.

The light source 108 is arranged at an angle at which a light component specularly reflected (that is, specular reflection) on the surface of the inspection target 10 is mostly incident on the camera 107.

On the other hand, the light source 109 is arranged at an angle at which a light component diffusedly reflected on the surface of the inspection target 10 is mostly incident on the camera 107.

In FIG. 2, the light source 108 is referred to as "light source A" and the light source 109 is referred to as "light source B".

In the case of the present exemplary embodiment, the light source 108 and the light source 109 are arranged on opposite sides of the optical axis of the camera 107, but these light sources may be arranged on the same side.

The light source 108 and the light source 109 may be parallel light sources or non-parallel light sources. The non-parallel light sources include, for example, point light sources and surface light sources.

In the case of the surface inspection apparatus 1 according to the present exemplary embodiment, an output axis of illumination light output from the light source 108, an output axis of illumination light output from the light source 109, and an optical axis of the camera 107 are arranged substantially on the same surface.

The communication IF 110 is configured with a module conforming to a wired or wireless communication standard. For the communication IF 110, for example, an Ethernet (registered trademark) module, a Universal Serial Bus (=USB) module, a wireless local area network (=LAN) module, or the like is used.

Structure of Optical System

Figure 3:
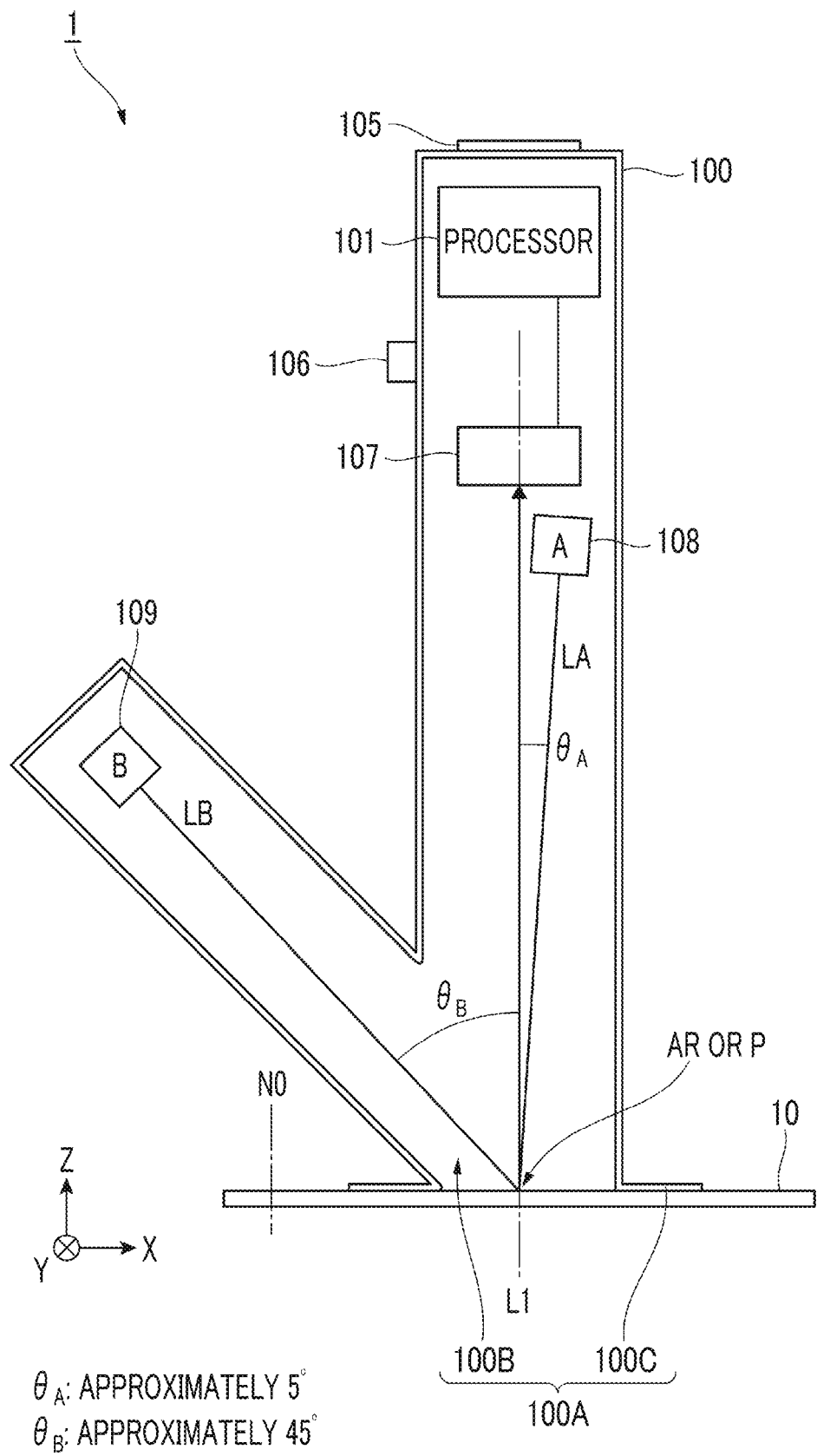
FIG. 3 is a diagram illustrating a structural example of an optical system of the surface inspection apparatus according to the first exemplary embodiment.

FIG. 3 is a diagram illustrating a structural example of an optical system of the surface inspection apparatus 1 according to the first exemplary embodiment. An opening portion 100A is provided in a part of a housing 100 of the surface inspection apparatus 1.

An opening 100B into which illumination light illuminating the surface of the inspection target 10 and reflection light reflected by the surface of the inspection target 10 are input or output, and a flange 100C surrounding the periphery of the opening 100B is provided in the opening portion 100A. In other words, the opening 100B is provided as a hole provided near a center of the flat plate-shaped flange 100C.

The opening 100B and the flange 100C have, for example, a circular shape. The opening 100B and the flange 100C may have other shapes. For example, the opening and the flange may have a rectangular shape.

The opening 100B and the flange 100C do not have to have similar shapes, the opening 100B may have a circular shape, and the flange 100C may have a rectangular shape.

The flange 100C is used for positioning the surface inspection apparatus 1 in an imaging direction with respect to the surface of the inspection target 10. In other words, the flange 100C is used for positioning the camera 107 and the light source 108 with respect to the surface to be inspected. The flange 100C also serves to prevent or reduce the incident of external light or ambient light on the opening 100B.

The housing 100 shown in FIG. 3 has a structure in which two members having a substantially cylindrical shape are connected. The processor 101, the camera 107, and the light source 108 are housed in one of the cylindrical members. The light source 109 is housed in the other cylindrical member.

Further, the display 105 and the operation reception device 106 are attached to an outer surface of the cylindrical member on the side where the camera 107 is attached.

An imaging lens (not shown) is arranged on an optical axis L1 of the camera 107 shown in FIG. 3. In a case where the parallel light sources are used for the light sources 108 and 109, a telecentric lens is used as the imaging lens. On the other hand, in a case where the non-parallel light sources are used for the light sources 108 and 109, a non-telecentric lens is used as the imaging lens.

In the case of FIG. 3, an optical axis of the illumination light output from the light source 108 is indicated by LA, and an optical axis of the illumination light output from the light source 109 is indicated by LB.

In the case of FIG. 3, a normal line N0 on the surface of the inspection target 10 having a flat plate shape is substantially parallel to the optical axis L1 of the camera 107.

The surface of the actual inspection target 10 has structural or design roughness, curved surfaces, steps, joints, micro roughness formed in the molding process, and the like.

Therefore, in the present exemplary embodiment, an average value of orientations of the normal N0 of a region AR of interest in the inspection target 10 or the normal N0 of a specific position P of interest may be used as the normal N0 of the inspection target 10.

In the case of FIG. 3, an angle between the optical axis LA of the illumination light output from the light source 108 and the optical axis L1 of the camera 107 is $\theta_A$, and the optical axis LB of the illumination light output from the light source 109 and the optical axis L1 of the camera 107 is $\theta_B$. In the case of the present exemplary embodiment, $\theta_A$ is approximately 5° and $\theta_B$ is approximately 45°.

Calculation of Score Representing Texture Difference

Figure 4:
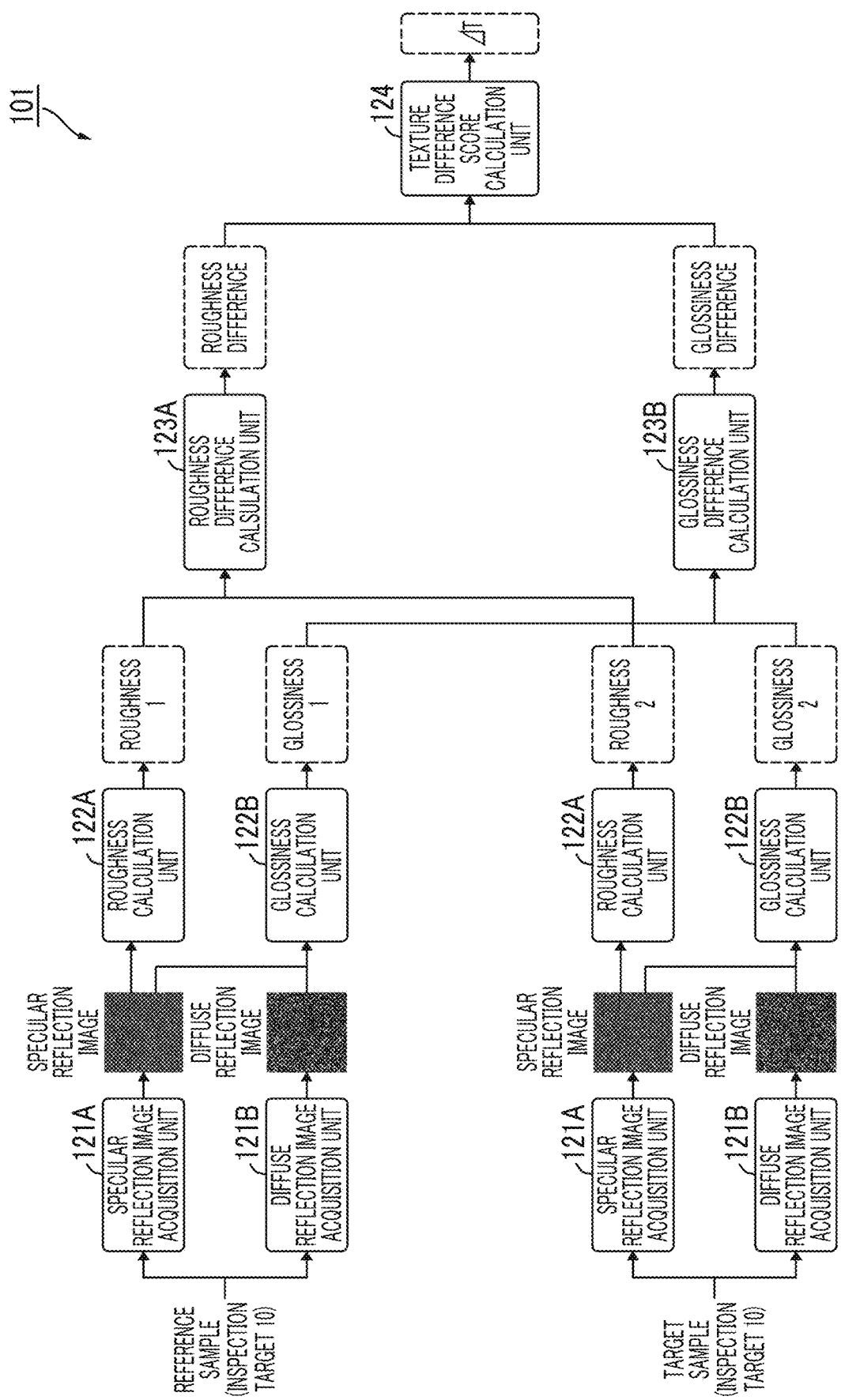
FIG. 4 is a diagram illustrating an example of a method for calculating a score that quantifies a texture difference between two samples.

FIG. 4 is a diagram illustrating an example of a method for calculating a score (hereinafter referred to as a "texture difference score") ΔT that quantifies the texture difference between two samples.

The calculation of the texture difference score ΔT is realized through the execution of the program by the processor 101 (see FIG. 2).

In FIG. 4, the inspection target 10 used as a reference is referred to as a "reference sample", and the inspection target 10 for inspecting the texture difference with respect to the reference sample is referred to as a "target sample".

In the present exemplary embodiment, the inspection target 10 to be inspected first is the reference sample, and the inspection target 10 to be inspected after the second is the target sample.

First, the processor 101 acquires a specular reflection image and a diffuse reflection image for each of the reference sample and the target sample.

In FIG. 4, a functional unit for acquiring the specular reflection image is referred to as a specular reflection image acquisition unit 121A, and a functional unit for acquiring the diffuse reflection image is referred to as a diffuse reflection image acquisition unit 121B. The specular reflection image is an example of an image of a specular reflection component, and the diffuse reflection image is an example of an image of a diffuse reflection component.

Although FIG. 4 illustrates that the specular reflection image acquisition unit 121A and the diffuse reflection image acquisition unit 121B are in parallel, the acquisition of the images by each acquisition unit is executed in chronological order.

Specifically, after the specular reflection image acquisition unit 121A acquires the specular reflection image by controlling only the light source 108 (see FIG. 3) in a turned-on state, the diffuse reflection image acquisition unit 121B acquires the diffuse reflection image by controlling the light source 109 (see FIG. 3) in a turned-on state.

Further, although FIG. 4 illustrates that the functional unit for acquiring the specular reflection image and the diffuse reflection image (hereinafter also referred to as an "image pair") from the reference sample and the functional unit for acquiring the image pair from the target sample are in parallel, these functional units are the same.

Specifically, the specular reflection image acquisition unit 121A and the diffuse reflection image acquisition unit 121B are used for both a process of acquiring the image pair from the reference sample and a process of acquiring the image pair from the target sample. These functional units are used in a case where the image pair is acquired from the reference sample and are then used in a case where the image pair is acquired from the target sample.

The specular reflection images obtained from the reference sample and the target sample are given to a roughness calculation unit 122A.

The roughness calculation unit 122A is a functional unit that calculates a score that evaluates a microscopic reflection light component acquired from the surface of the inspection target 10. In the present exemplary embodiment, the texture recognized by the microscopic reflection light component is referred to as "roughness", and the corresponding score is referred to as a "roughness score". The roughness score of the surface with few roughness is a relatively small value, and the roughness score of the surface with many roughness is a relatively large value. The roughness score is an example of a second value.

In the case of the present exemplary embodiment, for example, the roughness calculation unit 122A outputs, as the roughness score, an amplitude of the Fast Fourier Transform (FFT) of a specular reflection light component.

In the case of FIG. 4, "roughness 1" and "roughness 2" are the roughness scores. "Roughness 1" is the roughness score of the reference sample, and "roughness 2" is the roughness score of the target sample.

The roughness calculation unit 122A is used in both the calculation of the roughness score of the reference sample and the calculation of the roughness score of the target sample.

The specular reflection images acquired from the reference sample and the target sample, and the diffuse reflection images acquired from the reference sample and the target sample are given to a glossiness calculation unit 122B.

The glossiness calculation unit 122B is a functional unit that calculates a score that evaluates a macroscopic reflection light component acquired from the surface of the inspection target 10.

In the present exemplary embodiment, the texture recognized by the macroscopic reflection light component is referred to as "glossiness", and the corresponding score is referred to as a "glossiness score". The glossiness score of the surface where diffuse reflection light is dominant is a relatively small value, and the glossiness score of the surface where specular reflection light is dominant is a relatively large value. The glossiness score is an example of a first value.

In the case of the present exemplary embodiment, the glossiness calculation unit 122B outputs, as the glossiness score, a difference value between an average brightness value of the specular reflection image and an average brightness value of the diffuse reflection image (=the average brightness value of the specular reflection image−the average brightness value of the diffuse reflection image).

In the case of FIG. 4, "glossiness 1" and "glossiness 2" are the glossiness scores. "Glossiness 1" is the glossiness score of the reference sample, and "glossiness 2" is the glossiness score of the target sample.

The glossiness calculation unit 122B is used in both the calculation of the glossiness score of the reference sample and the calculation of the glossiness score of the target sample.

The roughness score of the reference sample and the roughness score of the target sample are given to a roughness difference calculation unit 123A.

The glossiness score of the reference sample and the glossiness score of the target sample are given to a glossiness difference calculation unit 123B.

The roughness difference calculation unit 123A is a functional unit that calculates a difference between the roughness score calculated for the reference sample and the roughness score calculated for the target sample, and outputs a score to which the roughness difference is given (hereinafter referred to as a "roughness difference score").

The glossiness difference calculation unit 123B is a functional unit that calculates a difference between the glossiness score calculated for the reference sample and the glossiness score calculated for the target sample, and outputs a score to which a glossiness difference is given (hereinafter referred to as a "glossiness difference score").

The calculated roughness difference score and glossiness difference score are given to the texture difference score calculation unit 124.

The texture difference score calculation unit 124 is a functional unit that calculates the texture difference score ΔT that quantifies a texture difference between the reference sample and the target sample felt by human.

Humans determines the texture difference between the surfaces of the two inspection targets 10 by comprehensively evaluating the difference in the glossiness and the difference in the roughness. Thus, in the present exemplary embodiment, the texture difference score $\Delta T$ is calculated by using a quantification model in which the difference in the glossiness and the difference in the roughness are used as parameters.

In the present exemplary embodiment, two types of quantification models are prepared. Hereinafter, the two types of quantification models are referred to as "quantification model 1" and "quantification model 2".

$\Delta T$=coefficient 1×glossiness difference+coefficient 2×roughness difference        Quantification model 1

$\Delta T$=√{(coefficient 1×glossiness difference)²+(coefficient 2×roughness difference)²}        Quantification model 2

In the case of the present exemplary embodiment, the quantification model used for calculating the texture difference score $\Delta T$ can be selected by the operator. The quantification model used for calculating the texture difference score $\Delta T$ may be fixed to either the quantification model 1 or the quantification model 2. The texture difference score $\Delta T$ is an example of a numerical value representing the texture difference.

Example of Operation Screen

Figure 5:
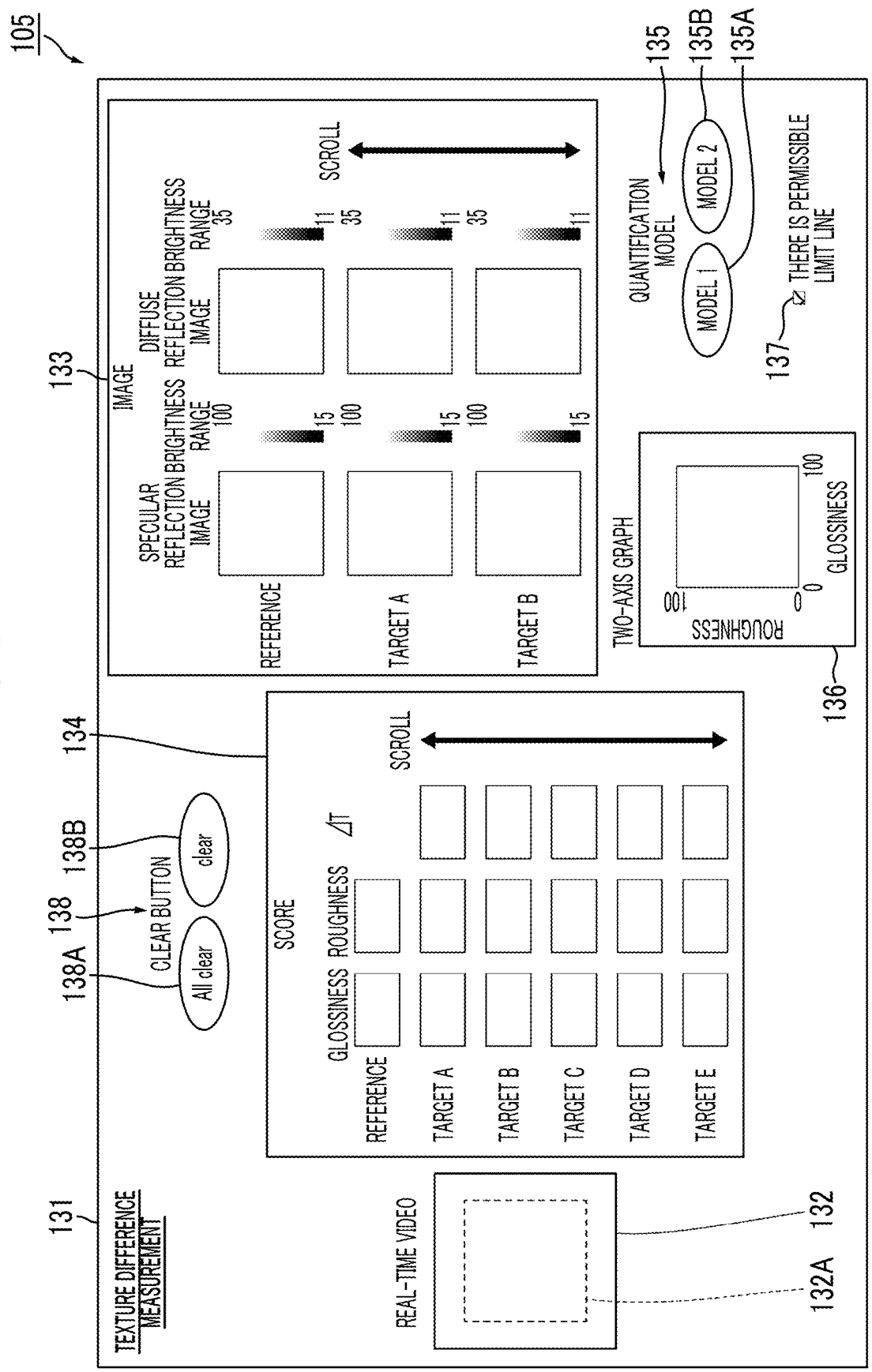
FIG. 5 is a diagram illustrating an example of an operation screen displayed on a display.

FIG. 5 is a diagram illustrating an example of an operation screen displayed on the display 105.

An operation screen 131 shown in FIG. 5 is an example of a screen showing the result of measuring the texture difference of the target sample with respect to the reference sample. Thus, a title of "texture difference measurement" is given to the operation screen 131.

The operation screen 131 shown in FIG. 5 is configured to have a plurality of display fields 132 to 138.

In the display field 132, a real-time video imaged by the camera 107 (see FIG. 2) in real time is displayed. In the surface inspection apparatus 1 according to the present exemplary embodiment, the light source 108 (see FIG. 2) is turned on by operating a power button, and the imaging by the camera 107 is started. The real-time video is used for confirming a portion imaged by the camera 107. Thus, the real-time video is irrelevant to the acquisition of the image used for the texture inspection.

The real-time video is displayed as a color image or a grayscale image. A rectangular frame 132A used as an index of a region used for the calculation of the score is displayed in the display field 132.

In the display field 133, an image imaged for inspecting the texture difference is displayed. The image in the display field 133 is an image positioned in the frame 132A at a point in time at which the operator operates an imaging button.

In a case where the imaging button is operated, two images of the specular reflection image and the diffuse reflection image are imaged as the inspection of the texture difference with a time difference. Thus, the specular reflection image and the diffuse reflection image are displayed for each sample in the display field 133.

In the case of FIG. 5, the reference sample is indicated by "reference", a target sample A is indicated by "target A", and a target sample B is indicated by "target B".

In the case of FIG. 5, although only two images corresponding to the target sample are displayed due to a display space, the images of the target sample displayed in the display field 133 can be changed by operating a scroll bar.

In the display field 133, the shading of pixels represents a brightness value. As the color of the pixel becomes darker, a brightness level becomes lower, and as the color of the pixel becomes lighter, the brightness level becomes higher.

A brightness range of the specular reflection image is 15 to 100, and a brightness range of the diffuse reflection image is 11 to 35. The brightness range also differs depending on the imaging conditions.

In the display field 134, the calculated score is displayed for confirmation by the operator. There are three types of scores of the glossiness score, the roughness score, and the texture difference score $\Delta T$. In FIG. 5, these scores are represented by "glossiness", "roughness", and "$\Delta T$".

The texture difference score $\Delta T$ is not displayed for the reference sample.

In the case of FIG. 5, it is possible to display scores of five target samples. Further, a scroll bar is arranged in a case where a larger number of target samples are targets to be inspected. It is possible to change the images of the target sample to be displayed in the display field 134 by operating the scroll bar.

Incidentally, the value of the texture difference score $\Delta T$ becomes a value different depending on the quantification model used for the calculation.

The display field 135 is displayed for selecting the quantification model to be used for calculating the texture difference score $\Delta T$. In the case of FIG. 5, a selection button 135A of "model 1" and a selection button 135B of "model 2" are displayed in the display field 135.

"Model 1" corresponds to "quantification model 1", and "model 2" corresponds to "quantification model 2".

In the display field 136, the textures of the reference sample and the target sample are displayed as coordinate points in a two-dimensional space.

In the case of FIG. 5, a two-axis graph with a horizontal axis representing the glossiness score and a vertical axis representing the roughness score is displayed in the display field 136, and symbols corresponding to the reference sample and the target sample are displayed at the corresponding coordinate positions. The two-axis graph mentioned herein is an example of a multidimensional distribution map.

The symbols representing the coordinate points may be the same for all the samples, but may be different for the reference sample and the target sample. Further, the symbols representing the coordinate points may be different in all the samples.

The difference in the symbol may be a difference in a shape of the symbol, a difference in color, or a difference in a combination of the shape and the color.

A text representing a sample name may be displayed in the vicinity of the symbol representing the coordinate point, or a legend showing a correspondence between the symbol and the sample may be displayed outside the field of the two-axis graph.

In the display field 137, a check box for selecting whether or not to display an index for determining the texture difference between the reference sample and the target sample is displayed.

In the case of FIG. 5, the check box of "there is a permissible limit line" is checked. The permissible limit line is a line that gives the limit of a permissible range of the texture difference with a coordinate value that gives the texture of the reference sample as a center. In a case where the check box is unchecked, the permissible limit line is not displayed on the two-axis graph.

A shape of the permissible limit line changes depending on the quantification model to be used to calculate the texture difference score ΔT. For example, the permissible limit line of "quantification model 1" has a rectangular shape, and the permissible limit line of "quantification model 2" has an elliptical shape or a circular shape.

The display field 138 is provided for deleting the score and the coordinate points displayed on the operation screen 131.

In a case where a "All clear" button 138A is operated, all the scores and the coordinate points on the screen are deleted.

In a case where a "clear" button 138B is operated, only the score and the coordinate point of the sample for which the image is acquired immediately before are deleted.

Figure 6A:
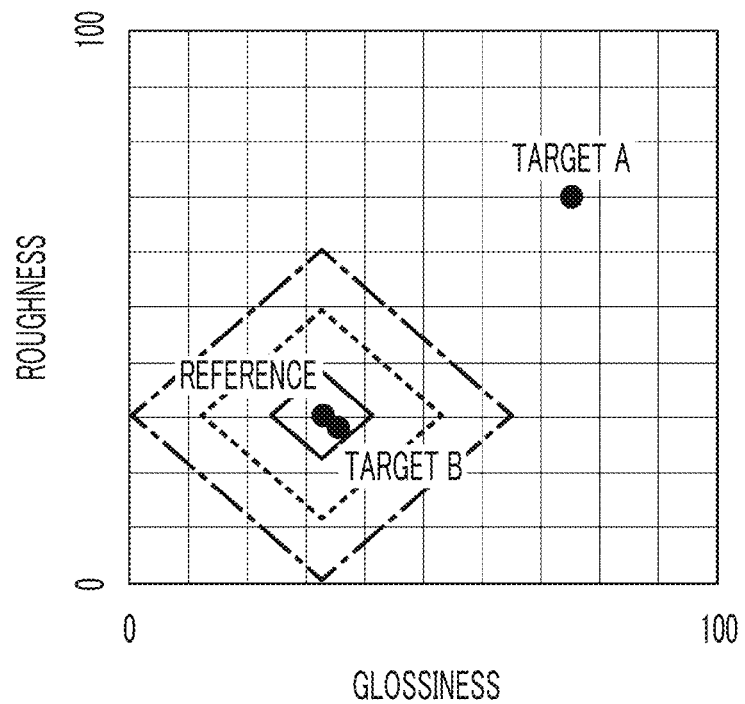
Figure 6B:
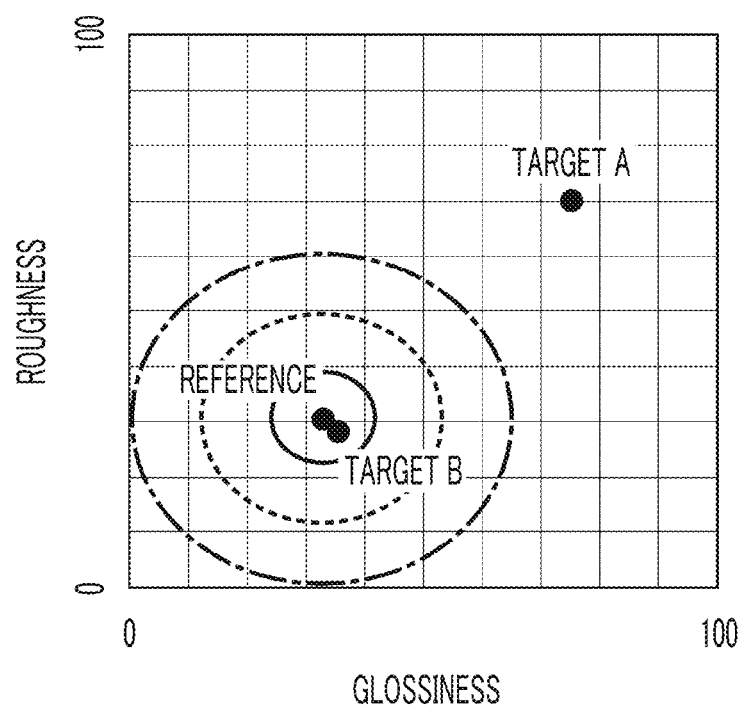

FIGS. 6A and 6B are diagrams illustrating display examples of the two-axis graph. FIG. 6A is a display example in a case where "quantification model 1" is used for calculating a texture difference score and FIG. 6B is a display example in a case where "quantification model 2" is used for calculating the texture difference score;

In the cases of FIGS. 6A and 6B, the coordinate points of the three samples are displayed with the same symbol on the two-axis graphs. Specifically, a circular mark is displayed at the coordinate point corresponding to each sample. Further, on the two-axis graphs shown in FIGS. 6A and 6B, the sample name is displayed next to each mark.

The permissible limit lines are displayed on the two-axis graphs shown in FIGS. 6A and 6B.

The permissible limit line on the two-axis graph of FIG. 6A corresponding to "quantification model 1" is represented by a rhombic shape which is a kind of rectangular shape.

On the other hand, the permissible limit line on the two-axis graph of FIG. 6B corresponding to "quantification model 2" is represented by an elliptical shape. As described above, the permissible limit line may have a circular shape.

In both of the two-axis graphs shown in FIGS. 6A and 6B, a plurality of permissible limit lines having similar shapes are concentrically displayed.

In the cases of FIGS. 6A and 6B, the number of permissible limit lines is three. Line types, thicknesses, colors, and the like of the three permissible limit lines may be the same or different.

The innermost permissible limit line of the three permissible limit lines gives, for example, a range where there is almost no texture difference, and the middle permissible limit line gives a range where there is a texture difference but the texture difference is not noticeable, and the outermost permissible limit line gives, for example, a threshold value for determining a defect. The distinction thereof is an example.

The number of permissible limit lines displayed on the two-axis graph is not limited to three, and may be one, two, or four or more.

Texture Difference Inspection

Figure 7:
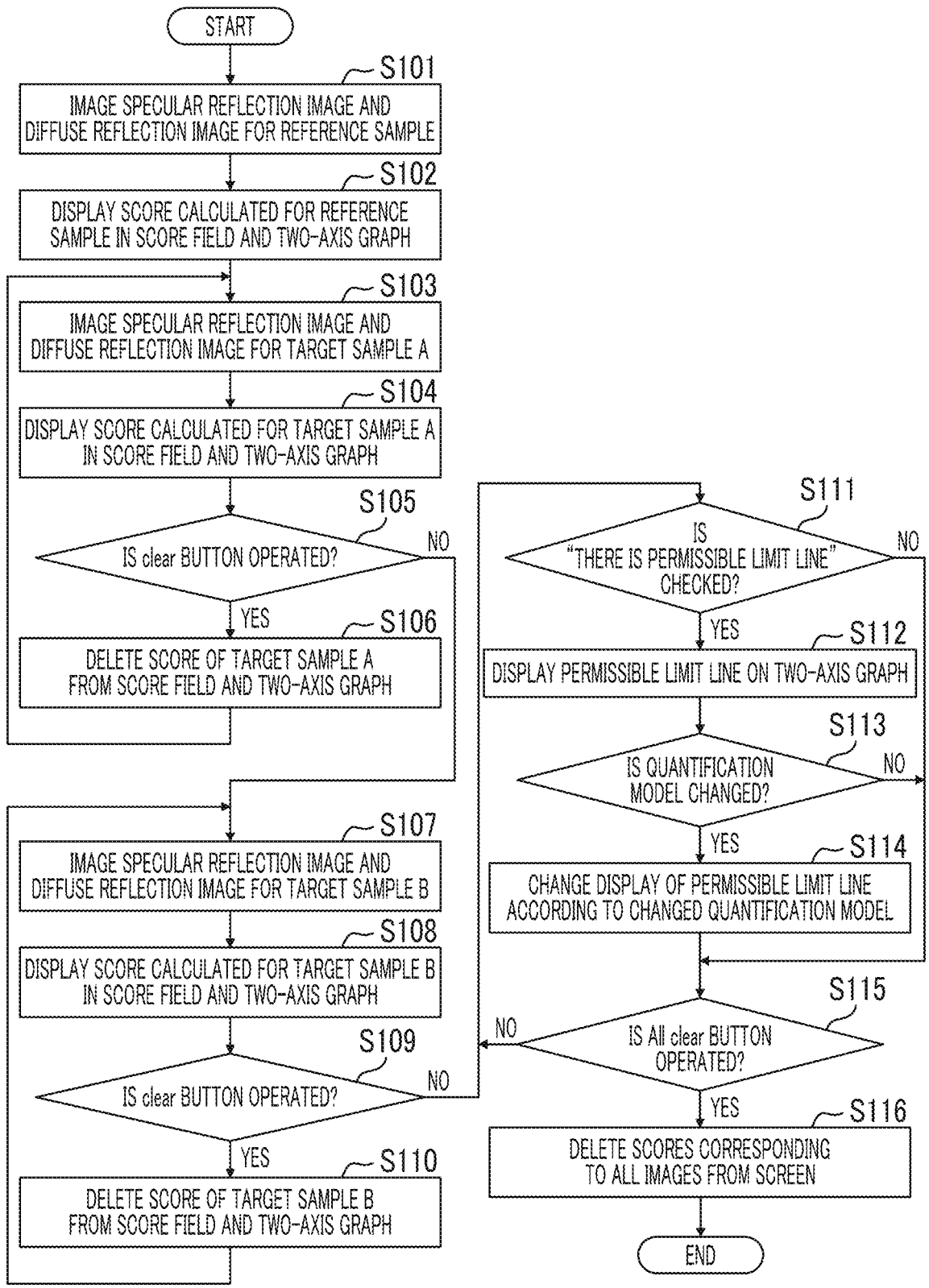
FIG. 7 is a flowchart showing an example of a processing operation executed at the time of inspecting a texture difference using a surface inspection apparatus.

FIG. 7 is a flowchart showing an example of a processing operation executed at the time of inspection of the texture difference using the surface inspection apparatus 1. A symbol S shown in the figure means a step.

The processing operation shown in FIG. 7 is controlled through the execution of the program by the processor 101 (see FIG. 2).

The processor 101 images the specular reflection image and the diffuse reflection image for the reference sample by detecting the operation of the imaging button (step S101).

The imaged specular reflection image and diffuse reflection image are displayed in the display field 133 (see FIG. 5). Further, the processor 101 calculates the glossiness score and the roughness score for the imaged specular reflection image and diffuse reflection image.

Subsequently, the processor 101 displays the scores calculated for the reference sample in the score field and the two-axis graph (step S102). The scores mentioned herein are the glossiness score and the roughness score.

The calculated scores are displayed in the display field 134 (see FIG. 5). Further, the calculated score is used as the coordinate value, and the symbol corresponding to the reference sample is displayed at the coordinate points on the two-axis graph.

Subsequently, the processor 101 images the specular reflection image and the diffuse reflection image of the target sample A by detecting the operation of the imaging button (step S103).

In a case where a new image pair is imaged, the processor 101 displays the score calculated for the target sample A in the score field and the two-axis graph (step S104).

In a case where the glossiness score and the roughness score are calculated for the target sample A, the processor 101 also calculates the texture difference score ΔT based on the quantification model selected in advance and displays he texture difference score in the display field 134.

In the case of FIG. 7, in the display of step S104, the permissible limit line is not displayed on the two-axis graph in the display field 136. At the stage of step S104, it may be determined whether or not there is a check for displaying the permissible limit line on the two-axis graph.

Subsequently, the processor 101 determines whether or not the "clear" button 138B (see FIG. 5) is operated (step S105). In a case where the operator wants to re-image the image of the target sample, the operator operates the "clear" button 138B.

In a case where a positive result is obtained in step S105, the processor 101 deletes the score of the target sample A from the score field and the two-axis graph (step S106). Thereafter, the processor 101 returns to step S103.

In a case where the operation of the imaging button is detected without obtaining a negative result in step S105, the processor 101 images the specular reflection image and the diffuse reflection image for the target sample B (step S107).

In a case where a new image pair is imaged, the processor 101 displays the calculated score for the target sample B in the score field and the two-axis graph (step S108).

Subsequently, the processor 101 determines whether or not the "clear" button 138B is operated (step S109).

In a case where a positive result is obtained in step S109, the processor 101 deletes the score of the target sample B from the score field and the two-axis graph (step S110), and returns to step S107.

In a case where the "clear" button 138B is not operated even after a predetermined time has elapsed, the processor 101 obtains a negative result in step S109.

Subsequently, the processor 101 determines whether or not "there is a permissible limit line" is checked (step S111).

In a case where a positive result is obtained in step S111, the processor 101 displays the permissible limit line on the two-axis graph (step S112). The permissible limit line is displayed with the symbol representing the texture of the reference sample as a center.

In the case of FIG. 7, the processor 101 subsequently determines whether or not the quantification model is changed (step S113).

In a case where a positive result is obtained in step S113, the processor 101 changes the display of the permissible limit line according to the changed quantification model (step S114). The texture difference score is also re-calculated according to the changed quantification model.

In a case where a negative result is obtained in step S111, or in a case where a negative result is obtained in step S113, or after the execution of step S114, the processor 101 determines whether or not the "All clear" button 138A is operated (step S115).

In a case where a negative result is obtained in step S115, the processor 101 returns to step S111.

On the other hand, in a case where a positive result is obtained in step S115, the processor 101 deletes all the images and the corresponding scores from the screen (step S116), and ends the inspection of the texture difference.

Although the processing operation shown in FIG. 7 represents a case where there are two target samples to be compared with the reference sample, in a case where there are three or more target samples, for example, step S107 to step S110 may be executed for the number of samples between step S110 and step S111.

Further, the determination in step S111 and the determination in step S113 may be executed whenever the image pair is acquired from one sample.

Specific Example of Operation Screen

Hereinafter, a specific example of an operation screen displayed at the time of inspection of the texture difference by the surface inspection apparatus 1 will be described.

Figure 8:
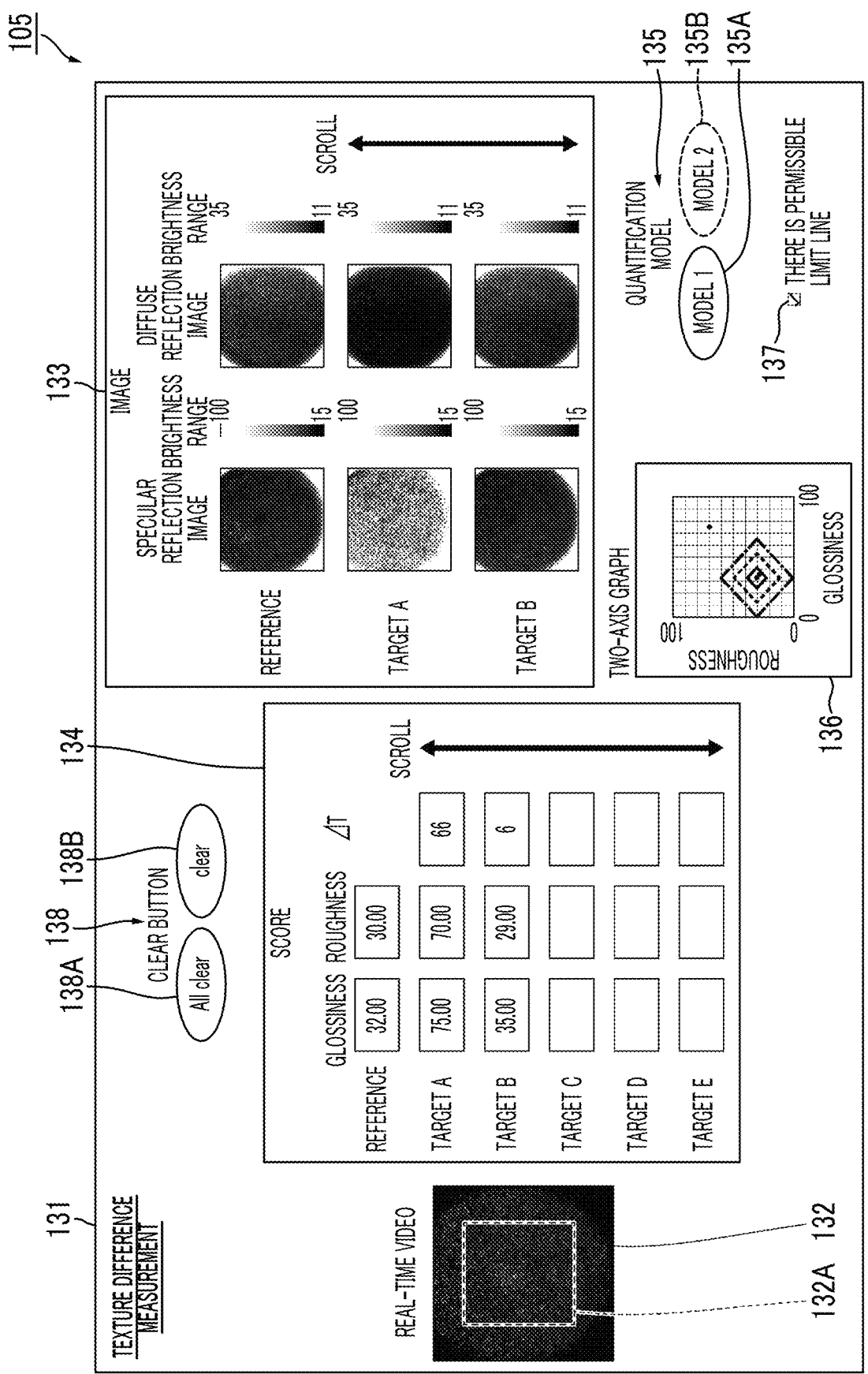
FIG. 8 is a diagram illustrating a specific example of an operation screen in a case where the use of "quantification model 1" is selected for displaying permissible limit line and calculating the texture difference score.

FIG. 8 is a diagram illustrating a specific example of the operation screen 131 in a case where the use of "quantification model 1" is selected for displaying the permissible limit line and calculating the texture difference score $\Delta T$. In FIG. 8, portions corresponding to the portions in FIG. 5 are denoted by the corresponding reference numerals.

In the case of FIG. 8, the actually imaged images are displayed in the display field 132 and the display field 133.

The image shown in FIG. 6A is reduced and displayed on the two-axis graph shown in the display field 136.

The operator may grasp the quantified texture difference as the positional relationship between the symbols on the two-axis graph and the positional relationship with the permissible limit line.

Figure 9:
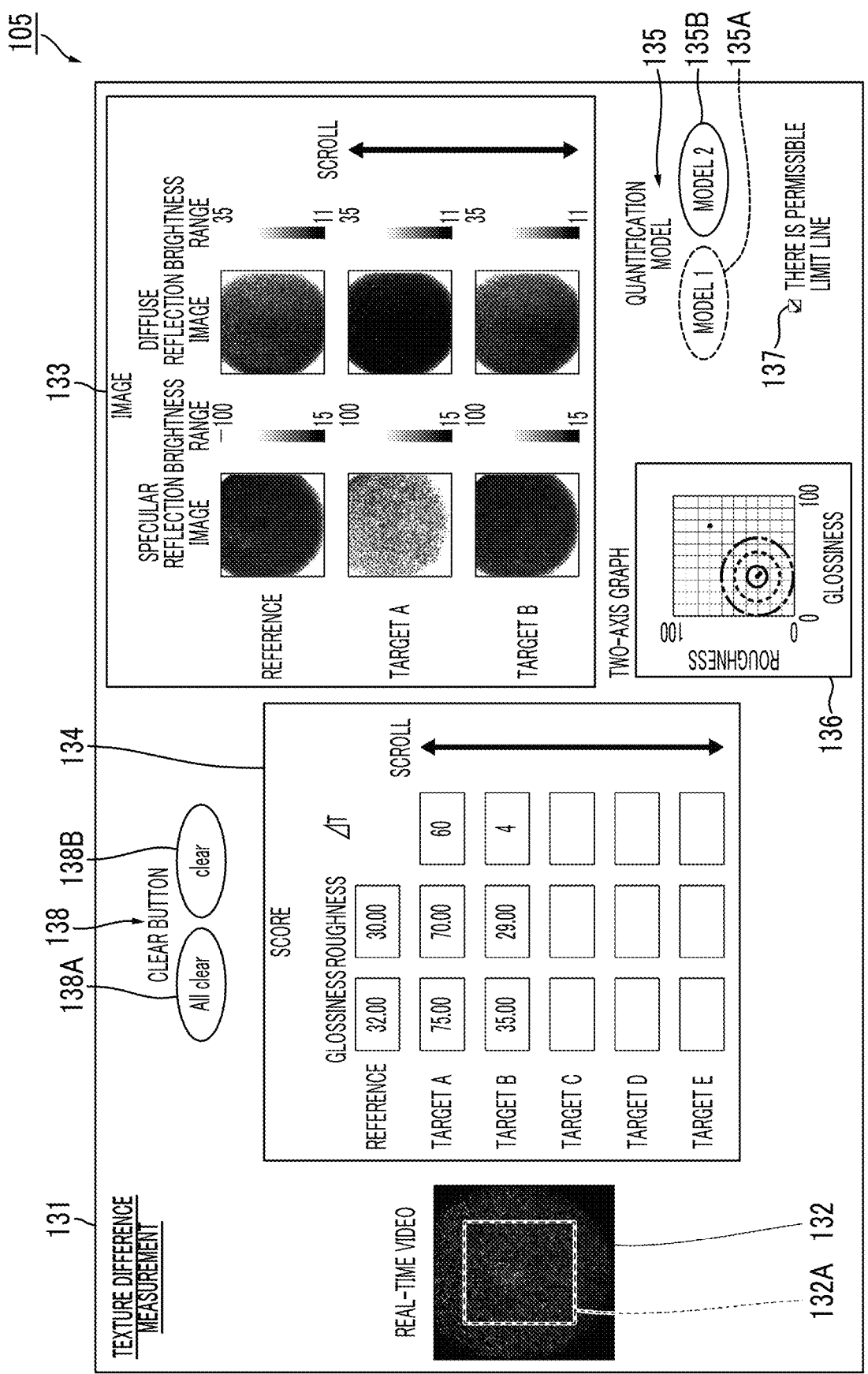
FIG. 9 is a diagram illustrating a specific example of an operation screen in a case where the use of "quantification model 2" is selected for displaying the permissible limit line and calculating the texture difference score.

FIG. 9 is a diagram illustrating a specific example of the operation screen 131 in a case where the use of "quantification model 2" is selected for displaying the permissible limit line and calculating the texture difference score $\Delta T$. In FIG. 9, portions corresponding to the portions in FIG. 5 are denoted by the corresponding reference numerals.

In the case of FIG. 9, the actually imaged images are also displayed in the display field 132 and the display field 133. Further, on the two-axis graph shown in the display field 136, the image shown in FIG. 6B is reduced and displayed.

In the case of FIG. 9, since the quantification model used for calculating the texture difference score $\Delta T$ is different from the model in FIG. 8, the value of the texture difference score $\Delta T$ is also different.

Figure 10A:
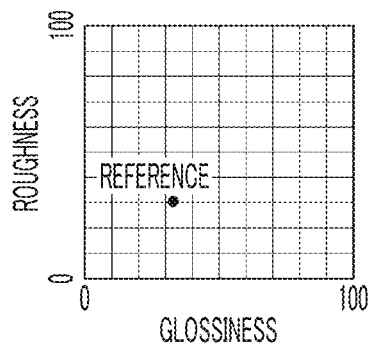
Figure 10B:
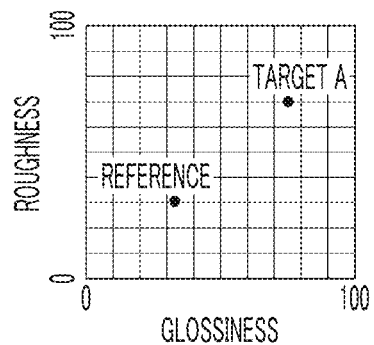
Figure 10C:
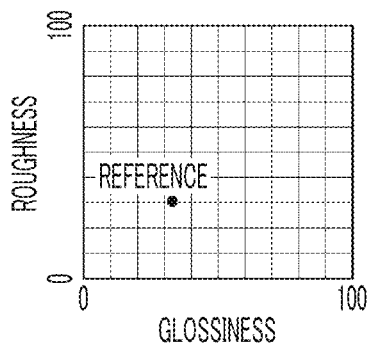
Figure 10D:
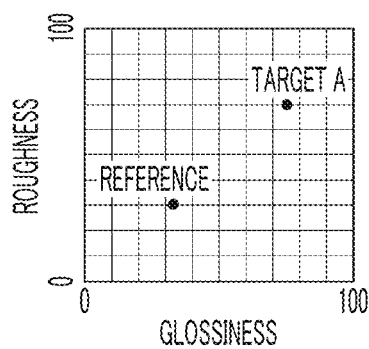
Figure 10E:
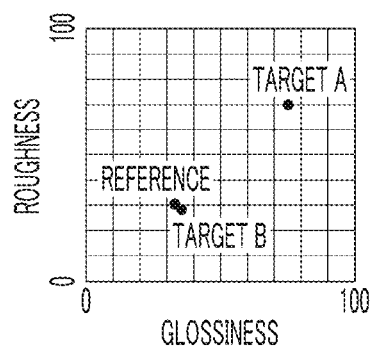
Figure 10F:
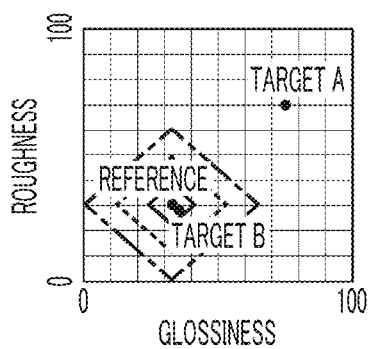
Figure 10G:
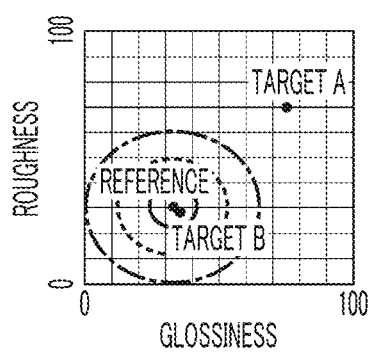
Figure 10H:
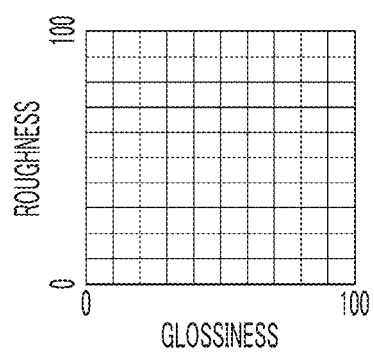

FIGS. 10A to 10H are diagrams illustrating changes in the display of the two-axis graph with the imaging of the reference sample and the target sample. FIG. 10A is a screen example corresponding to step S102 (see FIG. 7), FIG. 10B is a screen example corresponding to step S104 (see FIG. 7), FIG. 10C is a screen example corresponding to step S106, FIG. 10D is a screen example corresponding to step S104 after re-imaging, FIG. 10E is a screen example corresponding to step S108 (see FIG. 7), FIG. 10F is a screen example corresponding to step S112 (see FIG. 7), FIG. 10G is a screen example corresponding to step S114 (see FIG. 7), and FIG. 10H is a screen example corresponding to step S116 (see FIG. 7).

In the case of FIGS. 10A to 10H, the quantification model used for calculating the texture difference score $\Delta T$ represents a case where "quantification model 1" is changed to "quantification model 2".

Second Exemplary Embodiment

In the present exemplary embodiment, another calculation example of the texture difference score $\Delta T$ will be described.

The appearance configuration and the like of the surface inspection apparatus 1 according to the present exemplary embodiment are identical to the appearance configuration and the like of the surface inspection apparatus 1 described in the first exemplary embodiment.

Figure 11:
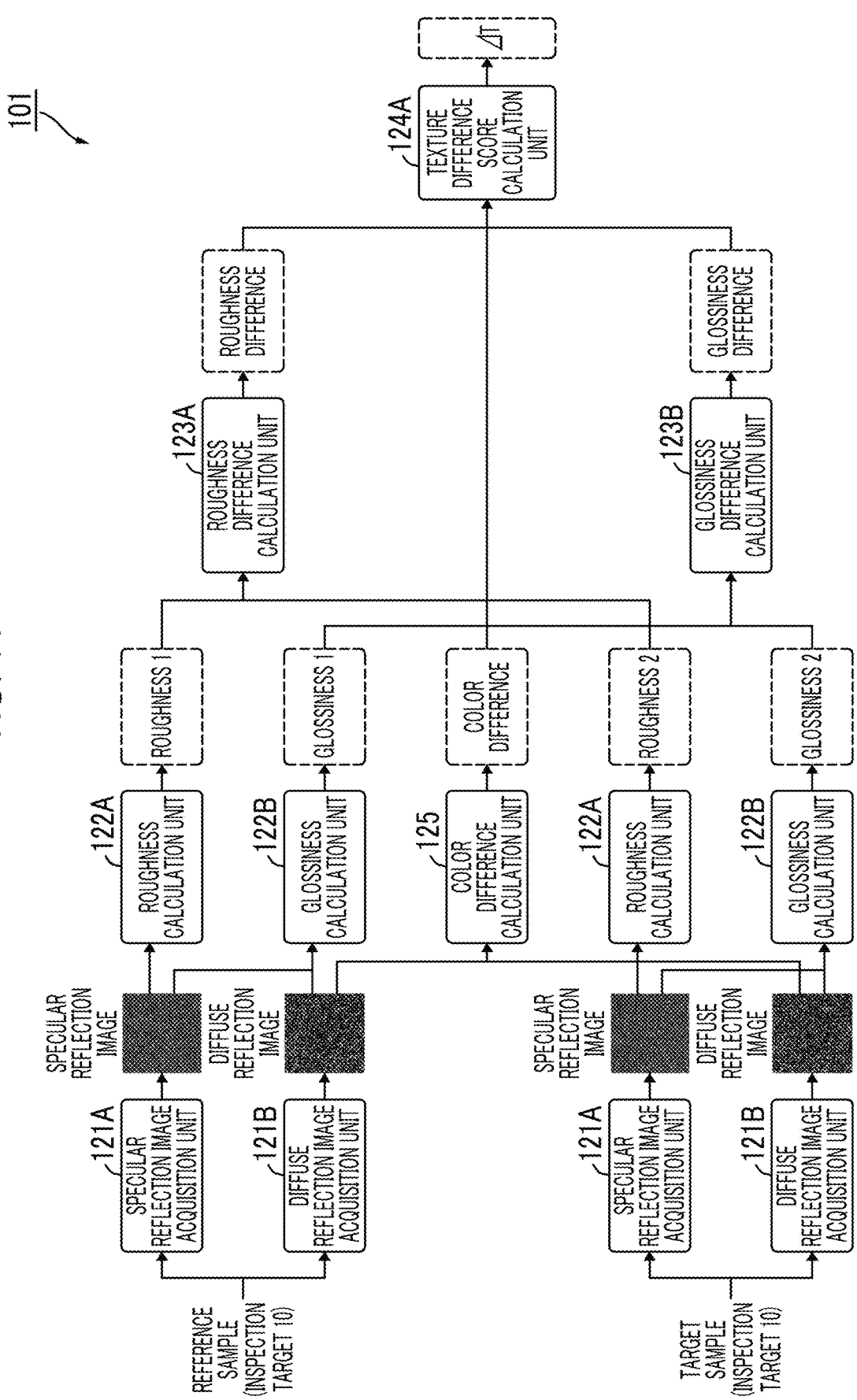
FIG. 11 is a diagram illustrating another example of the method for calculating the score that quantifies the texture difference between the two samples.

FIG. 11 is a diagram illustrating another example of the method for calculating the score that quantifies the texture difference between two samples. In FIG. 11, portions corresponding to the portions in FIG. 4 are denoted by the corresponding reference numerals.

In the case of the present exemplary embodiment, information representing a color difference is used for calculating the texture difference score.

In the case of FIG. 11, the processor 101 (see FIG. 2) has an additional function as a color difference calculation unit 125.

The color difference calculation unit 125 is a functional unit that calculates a score representing a color difference component (hereinafter referred to as a "color difference score") from the diffuse reflection image of the reference sample and the diffuse reflection image of the target sample, and outputs the calculated color difference score to the texture difference score calculation unit 124A.

First, the color difference calculation unit 125 calculates an average sRGB (=standard RGB) value of the diffuse reflection image. The average sRGB value is an average value of each of red (R) value, green (G) value, and blue (B) value.

Subsequently, the color difference calculation unit 125 converts the average sRGB value into an L*a*b* value.

Subsequently, the color difference calculation unit 125 calculates a color difference score $\Delta E$ by, for example, the following equation.

$$\Delta E = \sqrt{\{(L*1 - L*2)^2 + (a*1 - a*2)^2 + (b*1 - b*2)^2\}}$$

Here, L*1, a*1, and b*1 are values of the reference sample, and L*2, a*2, and b*2 are values of the target sample.

The color difference score $\Delta E$ may be calculated as a lightness difference $\Delta L*$, may be calculated as a chroma difference $\Delta C*$, or may be calculated as a hue difference $\Delta H*$. Each score is calculated by, for example, the following equation.

$$\Delta L* = |L*1 - L*2|$$

$$\Delta C* = |C*1 - C*2|$$

$$C* = \sqrt{(a*^2 + b*^2)}$$

$$\Delta H* = \sqrt{(\Delta E*^2 - \Delta L*^2 - \Delta C*^2)}$$

In a case where the color difference calculation unit 125 calculates any of the values as the color difference score, the texture difference score calculation unit 124A quantifies the texture difference by using the glossiness difference, the roughness difference, and the color difference.

In the case of the present exemplary embodiment, the quantification model 1 and the quantification model 2 are defined as follows.

$\Delta T$=coefficient 1×glossiness difference+coefficient 2×roughness difference+coefficient 3×color difference                Quantification model 1

$\Delta T = \sqrt{\{(\text{coefficient 1} \times \text{glossiness difference})^2 + (\text{coefficient 2} \times \text{roughness difference})^2\}} + \text{coefficient 3} \times \text{color difference}$                Quantification model 2

Figure 12:
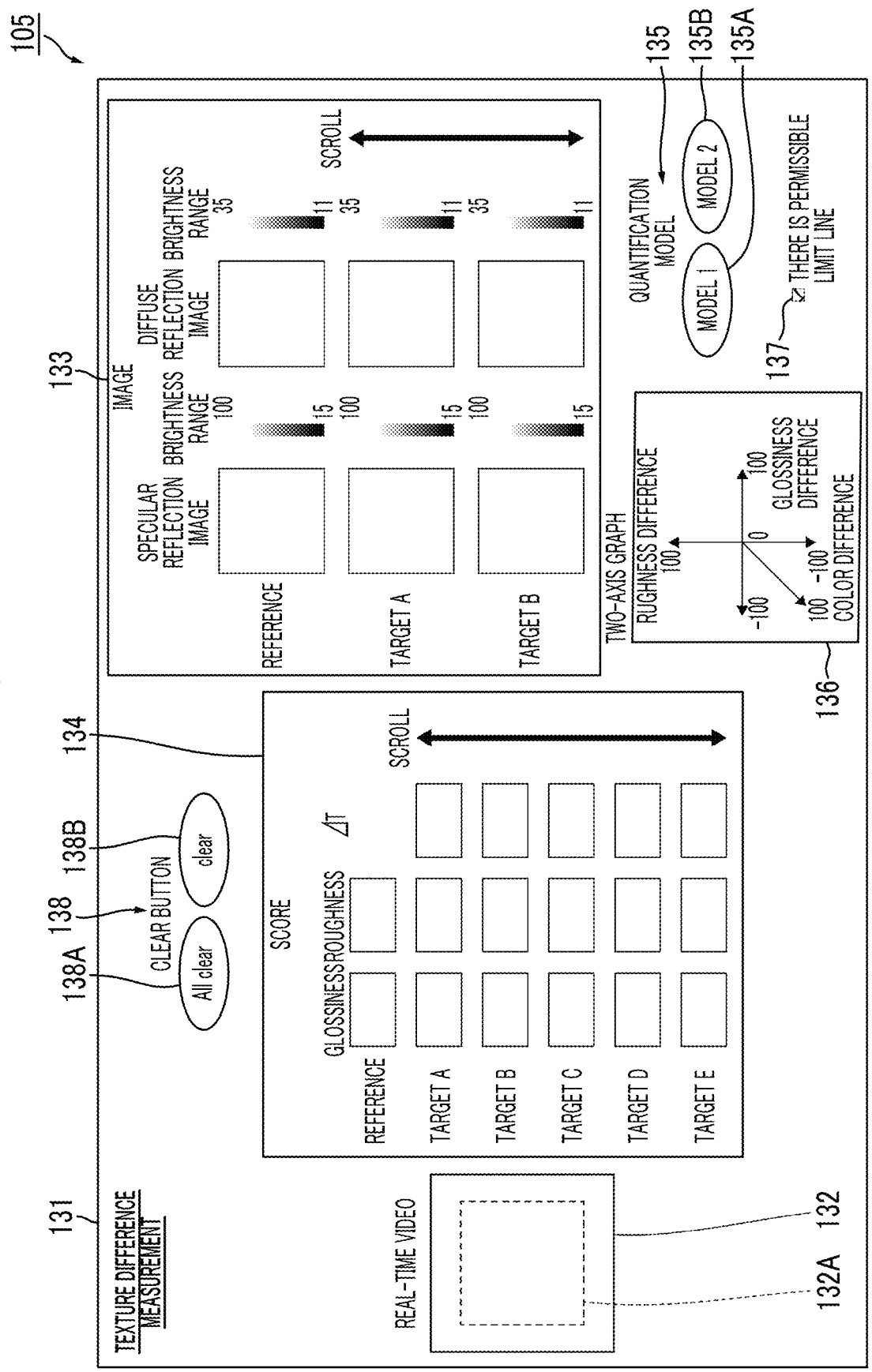
FIG. 12 is a diagram illustrating an example of an operation screen used in a second exemplary embodiment.

FIG. 12 is a diagram illustrating an example of an operation screen used in the second exemplary embodiment. In FIG. 12, portions corresponding to the portions in FIG. 5 are denoted by the corresponding reference numerals.

In the case of FIG. 12, the texture difference between the reference sample and the target sample in the display field 136 is displayed in relation to coordinate points in a three-dimensional space.

Specifically, a three-axis graph is displayed in which one axis is the glossiness difference score, one axis is the roughness difference score, and one axis is the color difference score. In the case of FIG. 12, not only the color difference score is added to the display of the display field 136, but also the glossiness score is changed to the glossiness difference score, and the roughness score is changed to the roughness difference score. Further, since the glossiness difference score and the roughness difference score are negative values, in the display field 136 shown in FIG. 12, a negative direction is also expressed for each axis corresponding to the glossiness difference score and the roughness difference score.

The three-axis graph mentioned herein is an example of a multidimensional distribution map.

In the case of the present exemplary embodiment, it is possible to confirm the texture difference including the information on the color difference on the sample surface in addition to the information on the brightness by the positional relationship between the coordinate points. That is, in the present exemplary embodiment, it is possible to perform visual determination not only from the quantified texture difference score $\Delta T$ but also from the relationship between the coordinate points on the three-dimensional graph.

Third Exemplary Embodiment

Figure 13:
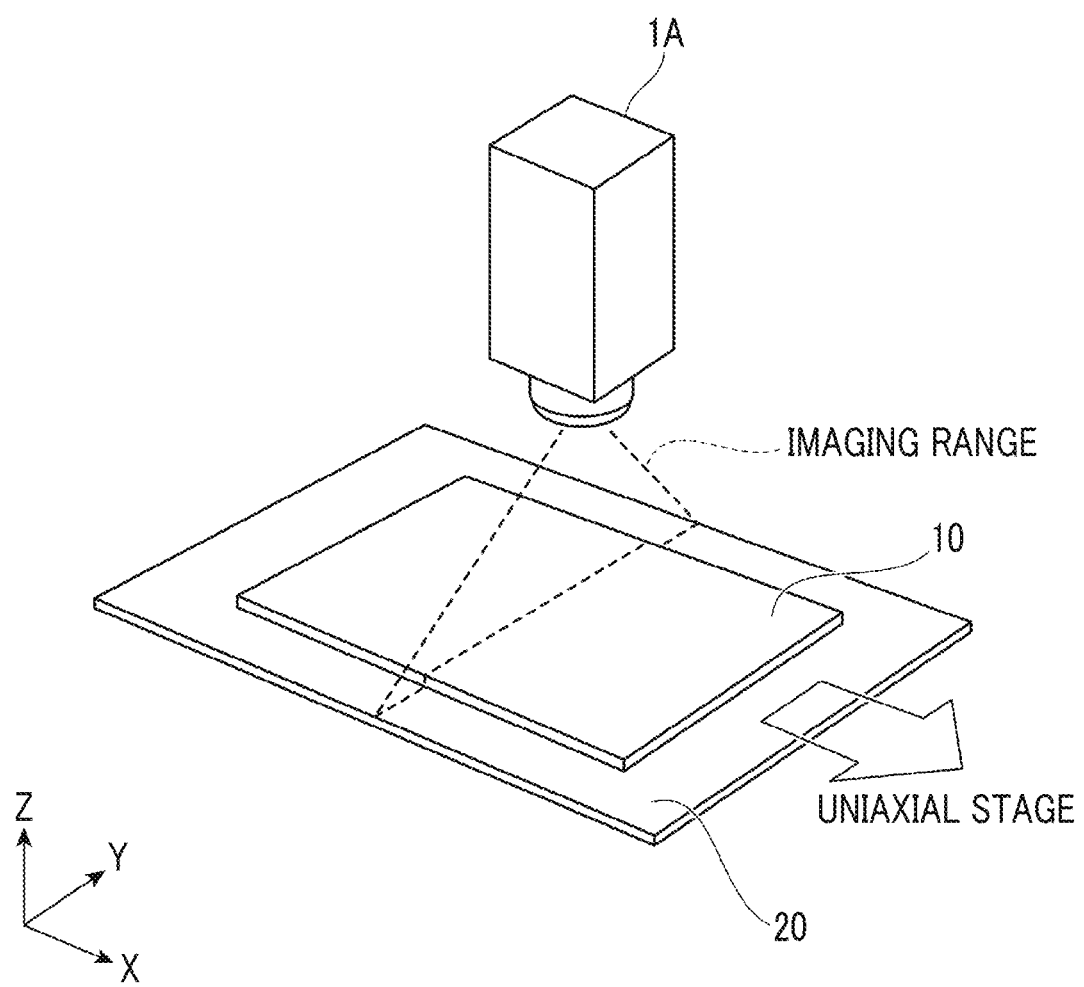
FIG. 13 is a diagram illustrating a usage example of a surface inspection apparatus assumed in a third exemplary embodiment.

FIG. 13 is a diagram illustrating a usage example of a surface inspection apparatus 1A assumed in a third exemplary embodiment. In FIG. 13, portions corresponding to the portions in FIG. 1 are denoted by the corresponding reference numerals.

A so-called line camera is used for the surface inspection apparatus 1A used in the present exemplary embodiment. Thus, the imaging range is linear.

In the case of the present exemplary embodiment, at the time of inspection, the inspection target 10 is moved in a direction of an arrow while being installed on a uniaxial stage 20. By moving the uniaxial stage 20 in one direction, the entire inspection target 10 is imaged.

The positional relationship between the camera 107 (see FIG. 2) and the light sources 108 and 109 is identical to the positional relationship in the first exemplary embodiment, except that the line camera is used as the camera 107 (see FIG. 2).

Other Exemplary Embodiments (1) Although the exemplary embodiments of the present invention have been described above, the technical scope of the present invention is not limited to the scope described in the above-described exemplary embodiments. It is clear from the description of the claims that the above-described exemplary embodiments with various modifications or improvements are also included in the technical scope of the present invention.

(2) In the above-described exemplary embodiments, a color camera is used as the camera 107 (see FIG. 2), but a monochrome camera may also be used. Further, the surface of the inspection target 10 (see FIG. 1) may be inspected using only the green (G) component of the color camera.

(3) In the above-described exemplary embodiments, a white light source is used as the light sources 108 and 109 (see FIG. 2), but the illumination light may be any color.

Further, the illumination light is not limited to visible light, but may be infrared light, ultraviolet light, or the like.

(4) In the above-described exemplary embodiments, although the processor 101 (see FIG. 2) of the surface inspection apparatus 1 (see FIG. 1) that images the inspection target 10 (see FIG. 1) realizes a function of calculating the score and displaying the score on the operation screen 131 (see FIG. 5), an equivalent function may be realized by a processor of an external computer or a server that acquires image data from the surface inspection apparatus 1.

(5) In the above-described exemplary embodiments, although the real-time video, the specular reflection image, and the diffuse reflection image are displayed on the operation screen 131 (see FIG. 5), a difference image between the specular reflection image and the diffuse reflection image used for calculating the glossiness may also be displayed on the operation screen 131. Further, the image after the specular reflection image is FFT-converted may also be displayed on the operation screen 131.

(6) In the above-described exemplary embodiments, it has been described that the sample imaged first at the time of the inspection of the texture difference is used as the reference sample, the second and subsequent samples are used as the target samples, and the texture difference score representing the texture difference of the target sample with respect to the reference sample is calculated, the reference sample and the target sample may be specified regardless of an inspection order. For example, any sample displayed on the operation screen of the display 105 may be designated as the reference sample.

(7) In the above-described exemplary embodiments, although the molded product is assumed as the inspection target 10 (see FIG. 1), the inspection target 10 is not limited to the molded product.

(8) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively.

The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A surface inspection apparatus comprising:
   an imaging device that images a surface of an object to be inspected; and
   a processor configured to:
   calculate a texture of the object through processing of an image imaged by the imaging device; and
   display a symbol representing the texture of the object at a coordinate position on a multidimensional distribution map,
   wherein an index that gives a permissible range of a texture difference with respect to an object as a reference is displayed on the multidimensional distribution map, and a texture of the reference is a center of the permissible range.

2. The surface inspection apparatus according to claim 1, wherein a plurality of the symbols are displayed on the multidimensional distribution map.

3. The surface inspection apparatus according to claim 2, wherein one of the plurality of symbols is a symbol representing the texture of the reference, and the other symbols are symbols representing textures of objects to be inspected.

4. The surface inspection apparatus according to claim 1, wherein display and non-display of the index are switched by a predetermined operation.

5. The surface inspection apparatus according to claim 4, wherein the index has a rectangular shape.

6. The surface inspection apparatus according to claim 4, wherein the index has an elliptical shape or a circular shape.

7. The surface inspection apparatus according to claim 1, wherein a plurality of the indexes are concentrically displayed according to steps of the permissible range.

8. The surface inspection apparatus according to claim 7, wherein the index has a rectangular shape.

9. The surface inspection apparatus according to claim 7, wherein the index has an elliptical shape or a circular shape.

10. The surface inspection apparatus according to claim 1, wherein the index has a rectangular shape.

11. The surface inspection apparatus according to claim 1, wherein the index has an elliptical shape or a circular shape.

12. The surface inspection apparatus according to claim 1, wherein shapes of the index are switched by a predetermined operation.

13. The surface inspection apparatus according to claim 1, wherein the coordinate position is defined by a first value representing a texture of a macroscopic reflection light component from the surface of the object and a second value representing a texture of a microscopic reflection light component from the surfaced of the object.

14. The surface inspection apparatus according to claim 13,
    wherein the first value is calculated based on an image of a specular reflection light component from the surface of the object and an image of a diffuse reflection light component, and
    the second value is calculated based on the image of the specular reflection light component from the surface of the object.

15. The surface inspection apparatus according to claim 13, wherein the processor is configured to:
    display the first value and the second value on a screen.

16. The surface inspection apparatus according to claim 15, wherein the processor is configured to:
    display a numerical value representing a texture difference between two objects calculated by using the first value and the second value on the screen.

17. The surface inspection apparatus according to claim 16, wherein the processor is configured to:
    calculate the numerical value representing the texture difference including information representing a color difference between the two objects.

18. A non-transitory computer readable medium storing a program causing a computer for processing an image obtained by imaging a surface of an object to be inspected by an imaging device to realize a function comprising:
    calculating a texture of the object; and
    displaying a symbol representing the texture of the object at a coordinate position on a multidimensional distribution map,
    wherein an index that gives a permissible range of a texture difference with respect to an object as a reference is displayed on the multidimensional distribution map, and a texture of the reference is a center of the permissible range.

19. A surface inspection method of a surface inspection apparatus comprising an imaging device and a processor, the surface inspection method comprising:
    calculating, by the processor, a texture of an object imaged by the imaging device; and
    displaying, by the processor, a symbol representing the texture of the object at a coordinate position on a multidimensional distribution map,
    wherein an index that gives a permissible range of a texture difference with respect to an object as a reference is displayed on the multidimensional distribution map, and a texture of the reference is a center of the permissible range.

* * * * *